United States Patent
Benito Izquierdo

(10) Patent No.: US 6,222,288 B1
(45) Date of Patent: Apr. 24, 2001

(54) ELECTRIC MOTOR

(75) Inventor: José Antonio Benito Izquierdo, Barcelona (ES)

(73) Assignee: Mavilor Systemes SA, Fribourg (CH)

(*) Notice: Subject to any disclaimer, the term of this patent is extended or adjusted under 35 U.S.C. 154(b) by 0 days.

(21) Appl. No.: 09/272,145

(22) Filed: Mar. 19, 1999

(30) Foreign Application Priority Data

Mar. 27, 1998 (CH) .................................................. 0745/98

(51) Int. Cl.[7] .............................. H02K 21/14; H02K 1/28; H02K 1/22; H02K 1/27
(52) U.S. Cl. ............................. 310/51; 310/156; 310/261
(58) Field of Search ............................. 310/156, 51, 158, 310/195, 216, 254, 261

(56) References Cited

U.S. PATENT DOCUMENTS

| 4,700,098 | 10/1987 | Kawashima ........................... 310/186 |
| 4,769,567 | 9/1988 | Tuneya et al. . |
| 5,396,137 | 3/1995 | Masayuki et al. . |
| 6,025,666 | 2/2000 | Kliman ................................. 310/156 |

FOREIGN PATENT DOCUMENTS

| 41 24 425 | 1/1992 | (DE) . |
| 5-137304 | 1/1993 | (JP) . |
| 6-133616 | 5/1994 | (JP) . |

OTHER PUBLICATIONS

International Search Report in SN 0745/98 CH.

*Primary Examiner*—Clayton LaBalle
(74) *Attorney, Agent, or Firm*—Bugnion S.A.; John Moetteli

(57) ABSTRACT

The invention relates to an electric motor comprising a rotor and a stator, one of the two being a slotted armature comprising a number R of slots, while the other comprises a number 2P of magnetic poles. Of the 2P angular gaps between the centers of the polar faces of two adjacent magnetic poles, (2P−1) gaps are each equal either to $a_1 = (360°/2P) - b$, or to $a_2 = (360°/2P) + b$, the angular distance $b$ being equal to $360°/2PR$.

2 Claims, 4 Drawing Sheets

Fig.3
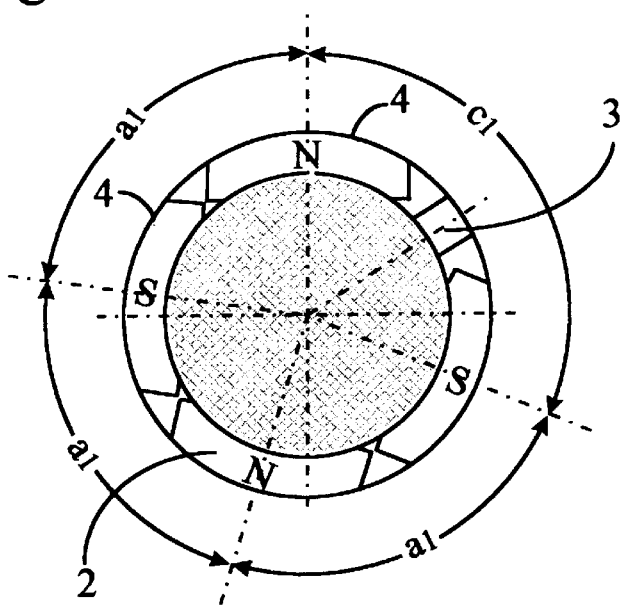
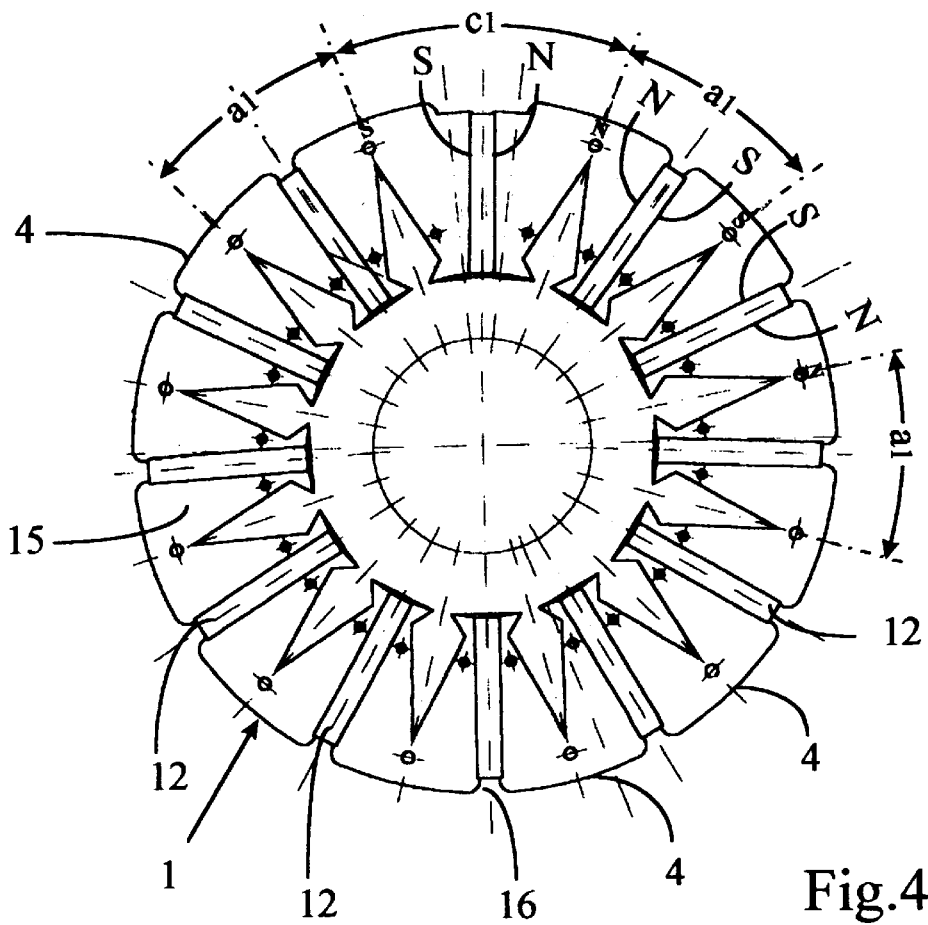
Fig.4

ELECTRIC MOTOR

BACKGROUND OF THE INVENTION

The invention relates to an electric motor comprising a stator and a rotor, one of the two parts being a slotted armature, with a number of slots equal to R, the other part comprising a number 2P of magnetic poles.

In electric motors, the advantage of the slots, from the magnetic point of view, is that the paths of the magnetic field through the air are shortened because they can enter the cogs of the armature directly from the pole pieces across a relatively small air gap and, from the mechanical point of view, is that the windings placed in the slots are prevented from moving laterally by the flanks of the cogs delimiting the slots.

However, slotted armatures have a drawback known as the "cogging torque" brought about by the interaction between the magnets and the slots of the armature.

This cogging torque and a solution to moderate it have been described, for example, in the article by Messrs Ackermann, Janssen, Sottek and van Steen published in IEE PROCEEDINGS-B vol. 139, No 4, July 1002, pages 315 to 320 and entitled "New technique for reducing cogging torque in a class of brushless DC motors". In this article, the measures proposed for reducing the cogging torque in permanent-magnet brushless motors, if the number of magnetic poles is fairly close to the number of armature slots, consist in carefully adjusting the size of the poles or the size of the slots.

In order to reduce this disadvantageous effect, it is also known practice, in motors with a long rotor and a radial air gap, to have on the shaft of the motor several magnets juxtaposed axially but slightly offset from one another in the peripheral direction.

SUMMARY OF THE INVENTION

The object of the invention is to propose another measure for modifying the variation in magnetic flux as a function of the angle of rotation, in such a way that the fluctuations caused by the presence of the slots are minimized.

For this purpose, the electric motor according to the invention as described in the preamble of claim 1, is one wherein, of the 2P angular gaps between the centers of the polar faces of two adjacent magnetic poles, (2P−1) gaps are each equal either to $$a_1 = (360°/2P) - b \quad (1)$$

or to $$a_2 = (360°/2P) + b \quad (2)$$

where the angular distance b has the value:

$$b = 360°/(2PR) \quad (3),$$

R being the number of slots.

Thus, instead of positioning the magnetic poles in the customary manner with a uniform distribution with all the gaps equal, namely with polar spacings equal to 360°/2P, (2P−1) gaps are reduced by the constant angle b or, alternatively, they are increased by this constant angle b in such a way that the remaining gap is, applying formula (I):

$$c_1 = 360° - (2P-1)a_1 \quad (4),$$

or, by applying formula (2):

$$c_2 = 360° - (2P-1)a_2 \quad (5)$$

This remaining gap is therefore either larger or smaller than the others. In the case of a motor according to formula (2), the motor must of course be designed in such a way that the remaining gap $c_2$ leaves enough space for the two magnetic poles which limit this gap $c_2$ to be fitted satisfactorily.

The solution proposed by the present invention makes it possible to reduce the fluctuations in magnetic flux as a function of the angle of rotation because in this way it is possible to avoid all the magnetic poles passing by the slots simultaneously.

BRIEF DESCRIPTION OF THE DRAWING(S)

The invention will be described with the aid of a number of embodiments.

FIGS. 1 to 4 refer to the case of a motor with a radial air gap with a permanent-magnet rotor and schematically illustrate four examples of rotors according to the invention, the stator which forms the armature being shown only partially in FIG. 1.

DETAILED DESCRIPTION OF THE PREFERRED EMBODIMENT(S)

Figure 1:
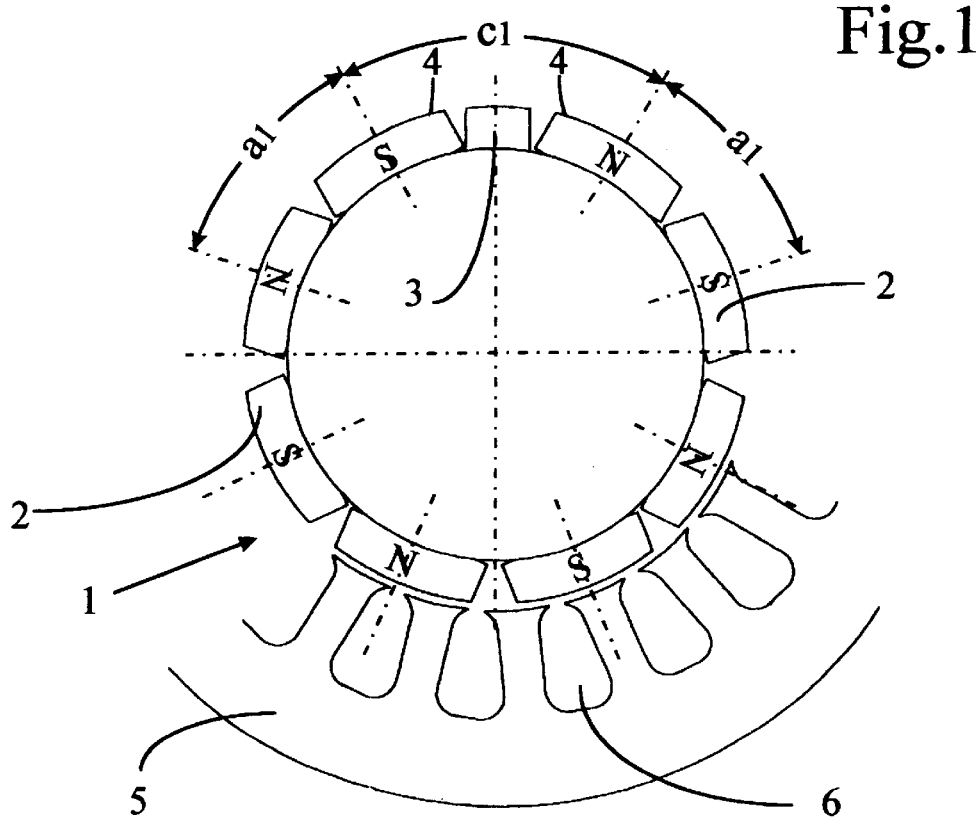

Referring to FIG. 1, the rotor 1 comprises eight permanent magnets 2 whose outer faces which form the periphery of the rotor are the polar faces 4 denoted by N, S. Thus, the number of poles is 2P=8. The number of slots 6 in the stator 5 depicted partially and without coil is R=24 and the angle b according to formula (3) is b=1.875°. Of the 2P angular gaps between the centers of the polar faces 4 of two adjacent magnetic poles, (2P−1) gaps have, according to formula (1), the value $a_1$=43.125°. The remaining gap is given by applying formula (4), namely $c_1$=58.125°. Thus, this gap $c_1$ is larger than the gap $a_1$ and in its central region has a neutral zone which is filled by a counterweight 3.

Figure 2:
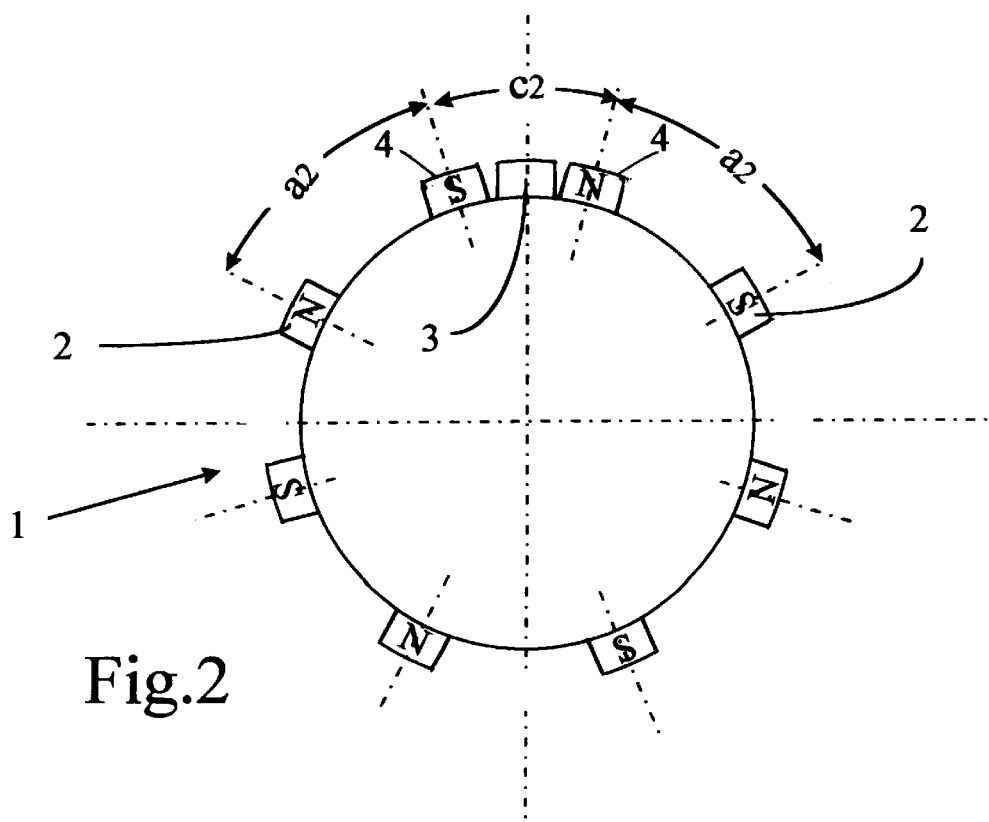

According to the example illustrated in FIG. 2, the data are the same as before, namely there are eight magnets 2 with the pole faces 4, and therefore the number of poles 2P=8, the number of slots R=24 and the angle b=1.875°, but this rotor is designed applying formula (2). There are therefore (2P−1) gaps $a_2$, the value of which is $a_2$=46.25°, and the remaining gap $c_2$ according to formula (5) is $c_2$=31.875°. In this case, the remaining gap $c_2$ determining the neutral zone is therefore smaller. In the example considered in FIG. 2, the ratio R/2P is equal to 3. In general, this ratio may have a value from 2 to 4.

According to the example illustrated in FIG. 3, the rotor has four magnets 2, therefore four polar faces 4 denoted by N, S; the number of poles is 2P=4 and the number of slots in the stator is R=12, the angle b being equal to 7.5°. This rotor is designed according to formula (1); $a_1=82.5°$ and the remaining gap $c^1=112.5°$, representing the neutral zone which is filled by a counterweight 3.

If the rotor had been designed according to formula (2), there would have been one gap $a_2=97.5°$ and the remaining gap $c_2=67.5°$. The ratio R/2P is equal to 3.

Finally, according to the example illustrated in FIG. 4, the rotor 1 consists of bundles of superimposed magnetic sheets cut radially to form cogs 15 constituting pole pieces and delimiting slots 16 between which flat magnets 12 in the form of thin plates with flat parallel opposed poles N, S are inserted in such a way that the surfaces of these flat poles are in planes parallel to the axis of the rotor, or in other words approximately in axial planes. The magnetic axis of these magnets 12 therefore extends in the peripheral direction of the rotor. These magnets 12 are arranged such that the lateral faces of a cog 15 which extend in the axial plane, and therefore parallel to the axis of the rotor, are in contact with poles of the same polarity of two successive magnets 12, as shown in FIG. 4 in the case of a number of magnets and a number of cogs. The magnetic flux of the magnets 12 passes through the cogs 15 and their peripheral frontal faces which constitute the polar faces 4 of the rotor.

In this construction, the surface area of a polar face 4 of a cog 15 of the rotor is less than twice the surface area of a flat pole of one of the magnets 12. This arrangement has the advantage that the magnetic flux is concentrated in the cogs 15 and there is therefore a concentrated flux passing through the polar faces 4 of the rotor.

In this example, the rotor 1 has 12 polar faces 4 separated by twelve magnets 2. We therefore have 2P=12 and a stator with 32 slots, and therefore R=32, is chosen. Applying formula (3), we have b=0° 56 minutes and with formula (1), the angle $a_1=29°$ 4 minutes. In this case, according to formula (4), the remaining gap is $c_1=40°$ 16 minutes.

Figure 5:
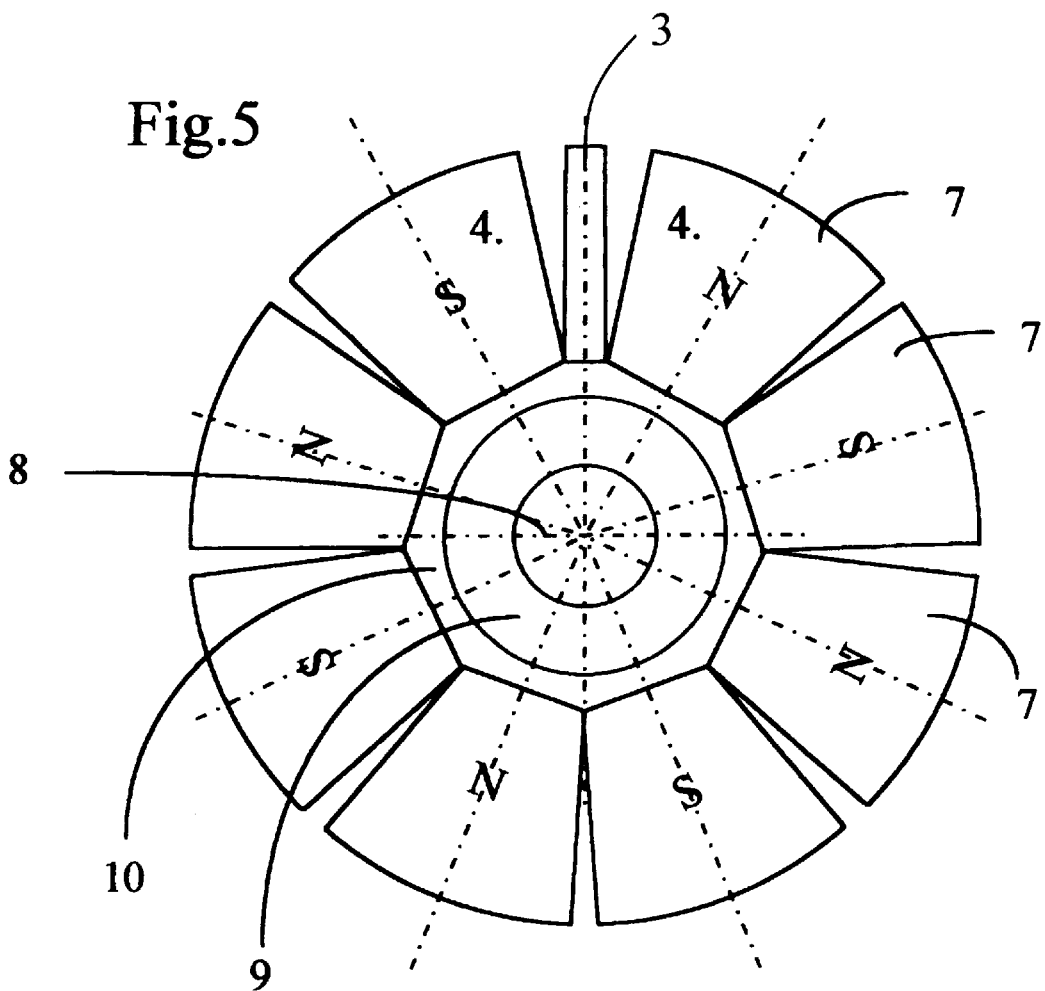
FIG. 5 is a schematically view of a flat rotor with an axial air gap.

FIG. 5 depicts the example of a flat rotor with eight poles 7, therefore a motor with an axial air gap, the polar faces N, S being in radial planes perpendicular to the axis of the rotor. This rotor is mounted on the shaft 8 via a support 10 made of a nonmagnetic material itself mounted on a bushing 9. Mounted in the remaining gap between the poles is a piece 3 made of magnetic sheet. The other characteristics of the rotor are the same as those given with reference to FIG. 1. The stator is beside the rotor and delimits an axial air gap. There may also be two stators arranged one on each side of the rotor.

In practice, to develop a motor according to the invention, values for the number of magnetic poles 2P and the number of slots R in the slotted armature are chosen first of all and then, using these values, the angle b is calculated using formula (3) and then the angular gap $a_1$ or $a_2$ respectively is calculated, using formula (1) or formula (2).

Figure 6:
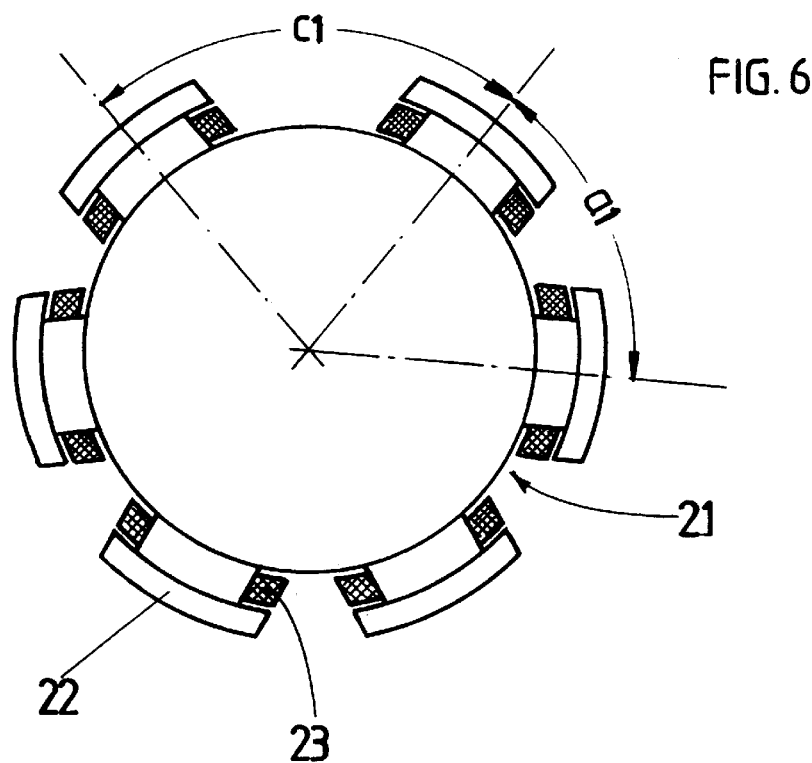
FIG. 6 is a schematically view of an alternative form of a rotor in which the poles consist of electromagnets.

As an alternative, the motor according to the invention may have electromagnets instead of permanent magnets, as illustrated in FIG. 6. According to this example, the rotor 21 has six electric magnetic poles 22 energized by coils 23, therefore 2P=6. Like in the previous embodiments, the value of the (2P−1) gaps between the centers of the electromagnetic poles is represented by the angle $a_1$ and the remaining gap is represented by the angle $c$,.

Figure 7:
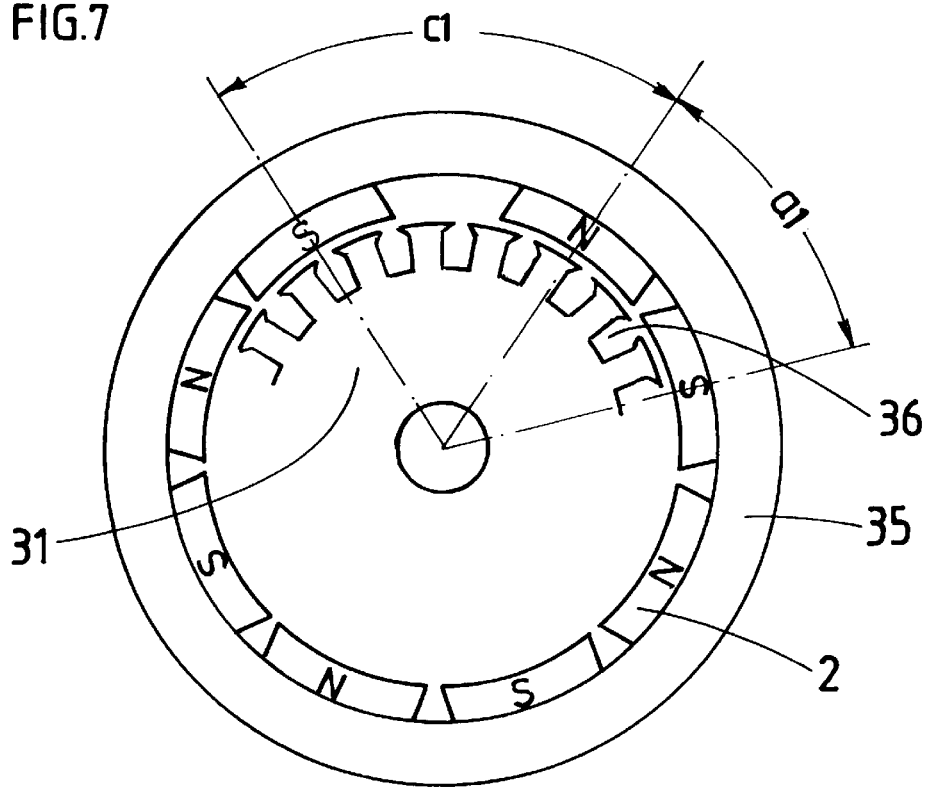
FIG. 7 is a schematically view of another alternative form with a slotted rotor surrounded by a stator fitted with permanent magnets.

According to another alternative form, the part carrying the magnets constitutes the stator and the slotted armature constitutes the rotor, as illustrated in FIG. 7. In this case, eight permanent magnets 2 are mounted on the stator 35, therefore 2P=8, whereas the rotor 31, illustrated partially, has slots 36 in which the coils, not depicted, are mounted. The value of the (2P−1) gaps between the permanent magnets is still represented by the angle $a_1$ and the remaining gap by the angle $c_1$.

What is claimed is:

1. An electric motor comprising a stator and a rotor, one of which being a slotted armature, in which the number of slots is equal to R, the other of which comprising a number 2P of magnetic poles, wherein of the 2P angular gaps between the centers of the polar faces of two adjacent magnetic poles, (2P−1) gaps are each equal either to $a_1=(360°/2P)−b$, or to $a_2=(360°/2P)+b$, the angular distance b being equal to 360°/(2PR).

2. A motor as claimed in claim 1 with a permanent-magnet rotor, wherein the rotor consists of bundles of superimposed magnetic sheets cut radially to form cogs (15) constituting pole pieces, the peripheral faces of which form the polar faces (4) of the rotor and delimiting slots (16) between which flat magnets (12) in the shape of thin plates with opposed flat poles (N, S) are inserted in such a way that the surfaces of these flat poles are in planes parallel to the axis of the rotor, these magnets 12 being arranged in such a way that the lateral faces of a cog (15) which extend in the axial plane are in contact with poles of the same polarity of two successive magnets and that the surface area of a polar face (4) of a cog (15) of the rotor is less than twice the surface area of a flat pole of one of the magnets (12).

* * * * *

UNITED STATES PATENT AND TRADEMARK OFFICE
CERTIFICATE OF CORRECTION

PATENT NO. : 6,222,288 B1
DATED : April 24, 2001
INVENTOR(S) : Josè Antonio Benito Izquierdo Page 1 of 1

It is certified that error appears in the above-identified patent and that said Letters Patent is hereby corrected as shown below:

<u>Column 4,</u>
Line 15, replace "c,." by -- $c_1$ --;

<u>Column 3,</u>
Line 4, replace "$c^1=112.5°$" by -- $c_1=112.5°$ --

Signed and Sealed this

Twenty-eighth Day of August, 2001

Attest:

*Nicholas P. Godici*

NICHOLAS P. GODICI
*Attesting Officer*    *Acting Director of the United States Patent and Trademark Office*